United States Patent [19]
Kasubke

[11] Patent Number: 5,474,269
[45] Date of Patent: Dec. 12, 1995

[54] CONNECTION BRACKET CLAMP

[75] Inventor: Volker Kasubke, Neunkirchen, Germany

[73] Assignee: Hydac Filtertechnik GmbH, Sulzbach/Saar, Germany

[21] Appl. No.: 205,778

[22] Filed: Mar. 3, 1994

Related U.S. Application Data

[63] Continuation of Ser. No. 854,695, Mar. 20, 1992, abandoned.

[30] Foreign Application Priority Data

Apr. 9, 1991 [DE] Germany .................. 41 11 359.4
Sep. 2, 1991 [DE] Germany .................. 9110844 U

[51] Int. Cl.⁶ ..................................................... F16L 3/12
[52] U.S. Cl. .................. 248/74.1; 248/74.3; 248/313; 248/230.9
[58] Field of Search ........................ 248/74.1, 74.3, 248/231, 313, 73

[56] References Cited

U.S. PATENT DOCUMENTS

| | | | |
|---|---|---|---|
| 928,711 | 7/1909 | Taft | 248/74.3 |
| 1,085,421 | 1/1914 | Hiller | 248/74.3 |
| 1,187,430 | 6/1916 | Kenly . | |
| 1,641,559 | 9/1927 | Thompson | 248/231 |
| 2,277,738 | 3/1942 | Wilkinson | 248/313 X |
| 2,395,745 | 2/1946 | King | 248/74.3 X |
| 2,845,681 | 8/1956 | Graef | 24/279 |
| 2,895,748 | 7/1959 | Oldham | 285/410 |
| 3,632,069 | 1/1972 | Thayer | 248/56 |
| 4,061,299 | 12/1977 | Kurosaki | 248/73 |
| 4,125,240 | 11/1978 | Heard | 248/231 X |
| 4,382,570 | 5/1983 | Craig | 248/231 X |
| 4,445,255 | 5/1984 | Olejack | 24/284 |
| 4,783,029 | 11/1988 | Geppert et al. | 248/74.1 |
| 4,858,860 | 8/1989 | Richards | 248/74.1 X |

FOREIGN PATENT DOCUMENTS

| | | |
|---|---|---|
| 674127 | 1/1930 | France . |
| 2519405 | 7/1983 | France . |
| 2578593 | 9/1986 | France . |
| 286561 | 10/1988 | France . |
| 1947749 | 10/1956 | Germany . |
| 1108019 | 5/1961 | Germany . |
| 6931027 | 7/1969 | Germany . |
| 3346423 | 8/1984 | Germany . |
| 3522497 | 1/1987 | Germany . |

*Primary Examiner*—Eugenia Jones
*Attorney, Agent, or Firm*—Roylance, Abrams, Berdo & Goodman

[57] ABSTRACT

A clamp includes a flexible collar with a locking part, a holding part with two cutouts receiving the collar, and a holding mechanism for locking the collar in place on the holding part. The two cutouts open exteriorly on one side of the holding part.

23 Claims, 4 Drawing Sheets

CONNECTION BRACKET CLAMP

This is a continuation of application Ser. No. 07/854,695 filed Mar. 20, 1992 abandoned.

FIELD OF THE INVENTION

The present invention relates to a clamp with a flexible collar on which a locking assembly is arranged. The clamp includes a holding part with cutouts for engagement of the collar and with holding means for securing the collar in position on the holding part.

BACKGROUND OF THE INVENTION

French Patent No. 674,127 discloses a clamp with a flexible collar constructed of two identical clamp halves. The clamp halves are bent at their ends and then are turned toward the locking part causing the formation of an undercut for engaging a cutout of a holding part. The holding part is formed of a notch in a flat plate, an angle member or a pipe. The collar takes a definite position in relation to the holding part, simplifying the assembly steps only after the article in the shape of a pipe, which is to be received by the collar, is wrapped and clamped by that collar. No further force of any magnitude can be exerted on the article to be received in the collar to clamp this article by means of the collar. Otherwise the danger arises that the collar may flex at the point of the undercut, and as a result, the tight connection to be produced between collar and holding part fails. Additionally, this conventional clamp is costly to manufacture.

Other clamps of a different sort are commercially available. These clamps generally incorporate at least one flexible collar on which is arranged at least one locking part and have a holding part at their disposal. A very wide variety of articles can be received and clamped by these clamps, especially pipes with large diameters of certain types of pressure reservoirs. With this known clamp, the holding part is tightly or fixedly weld-connected with the collar which in turn is flexible. The rigid structure of the known clamp is then formed. The articles to be received must be introduced into the clamp from the front and are fixed in the clamp by means of the locking part which is part of the clamp. Insofar as it is not possible to thrust the article in through the front because of insufficient clearance, such clamps have also been provided with a detachable collar. The detachable collar can be connected, following insertion of the article to be received and clamped, by means of two locking parts provided with another collar at their ends, onto which the holding part is welded. In these two types of clamps of another class, only an article with a predetermined diameter can be received in the clamps, and the clamps are fitted to the articles beforehand by means of appropriate dimensions.

SUMMARY OF THE INVENTION

An object of the present invention is to provide a clamp by means of which great holding forces can be exerted on the article received in the clamp, without giving rise to material breakdown, and by means of which articles of a great range of different dimensions can be received securely and clamped tightly.

This object is attained by a clamp comprising a flexible collar with a locking part, a holding part with first and second cutouts receiving the collar, and holding means for locking the collar in place on the holding part. Both cutouts open out toward one and the same side of the holding part facing the outside.

Following insertion of the collar into both cutouts of the holding part, the collar occupies a definite position which increases the ease of assembly, especially for subsequent clamping of the article to be received. The article is generally in the form of a pipe. This arrangement, according to the present invention, guarantees that the collar can be constructed of one piece and be fixed to the holding part, at least at the points of engagement, so that considerable holding strength can be exerted by the holding part on the article to be received, without breakdown of the hold.

The collar is positioned in the holding part in such manner that the unattached or free ends of the collar can be sprung wide apart to receive the article and then back together again for fixing the article in the clamp. Even articles with the widely varying widths, deviating greatly from one another, can be considerably more securely fixed. If the clamp is to receive articles of an entirely different range of widths, the collar for this different range can be exchanged without any problem for the collar connected until this time with the holding part. Introduction of the article to be received into the clamp from the front is no longer required. Furthermore, the clamp according to the present invention can be manufactured with simple technical means and can thus be cost-effective.

If the collar is not required at any time, the holding part can remain in its position, for instance against a housing wall or a building wall. Subsequently the holding part may be provided with the relevant collar, only if needed in an emergency.

In consideration of the possible separation of holding part and collar, the holding part can be assembled first and then subsequently provided with the collar. Also, the clamp according to the present invention can, without much difficulty, be attached at points which are not easily accessible with the traditional fastening means, such as screws.

Because of the greater flexibility of the collar according to the present invention, noncylindrical as well as cylindrical bodies, including oval bodies of predetermined width, can be clamped tightly, and thus, locked in place.

With one preferred embodiment of the clamp according to the present invention, a connecting part can be inserted into the holding part. By use of the connecting part, the collar can be tightly connected with the holding part. In addition to the secure clamp connection obtained in this manner, direct contact of the received and clamped article against the holding part can be avoided, so that material damage by corrosion does not occur in this region.

Preferably, the connection part of the clamp according to the present invention has a contact surface for the article to be received by the clamp. The contact surface for the article to be received can be adapted to the shape of the section according to the structural conditions relevant in each case. Thus, the contact surface can be configured to be rounded to be a centering means allowing almost linear contact of the article to be received and clamped. Following clamping by means of the locking part, the contact surface can be converted through the contact pressure being generated by the clamping into a laminar or substantially flat contact area, providing a favorable effect on the force distribution.

In one preferred embodiment of the clamp, the holding part has a support part with a curved configuration between its two cutouts. Such curve is smaller than or identical to the curve of the collar in the region between these cutouts. By this means, the smaller the curve of the collar, the greater in turn can be the curve diameter of the clamp. In the opposite case, the curve of the collar can be of such dimensions that even articles which are of elliptical cross section can be held securely.

In another preferred embodiment of the clamp according to the present invention, the holding part is at least in part wider than the collar. The support part is connected with a leg by means of which the clamp can be mounted. For this reason the mounting means, such as for example screws, intended for mounting the holding part and with it the clamp on a different part, for instance on a housing wall, can if needed penetrate through the holding part into a region which is free of the collar. Tilting, canting or twisting of the connection means by their insertion is avoided. A simpler accessibility for the assembly tools is also attained.

The collar is preferably of one piece, which allows simple and cost-effective manufacture of the same.

In another especially preferred embodiment of the clamp according to the present invention, the locking part includes two pegs wrapped by the two ends of the collar. One peg is arranged pivotally and incorporates a longitudinally adjustable catch part. The adjustable catch part can be inserted into a cutout in the other peg. A rapid closure mechanism is attained by this means, wherein articles are connected undetachably with the collar. The longitudinally adjustable catch part also promotes use of the clamp for articles which fall within a large, predetermined range of diameters and/or widths. The wrapping and clamping of the pegs of the locking part by the ends of the collar guarantees a secure hold of the collar. Considerable holding force can be exerted with the locking part in the clamp according to the present invention on the article to be received, without causing breakdown at the site of the peg.

In the clamp according to the present invention, the collar preferably includes at least one attachable/detachable profiled rubber member. Especially when the articles to be received are of soft material, this profiled rubber member forms a protection against wear. Furthermore, oscillations which can arise in the articles to be received are damped by the profiled rubber member.

Preferably, the collar of the clamp according to the present invention is of Nirosta steel; the holding part is a steel sheet; and the connecting device is of polyethylene.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 4 is an enlarged partial front elevational view in cross section of a clamp with a modified collar 10a;

DETAILED DESCRIPTION OF THE INVENTION

Figure 1:
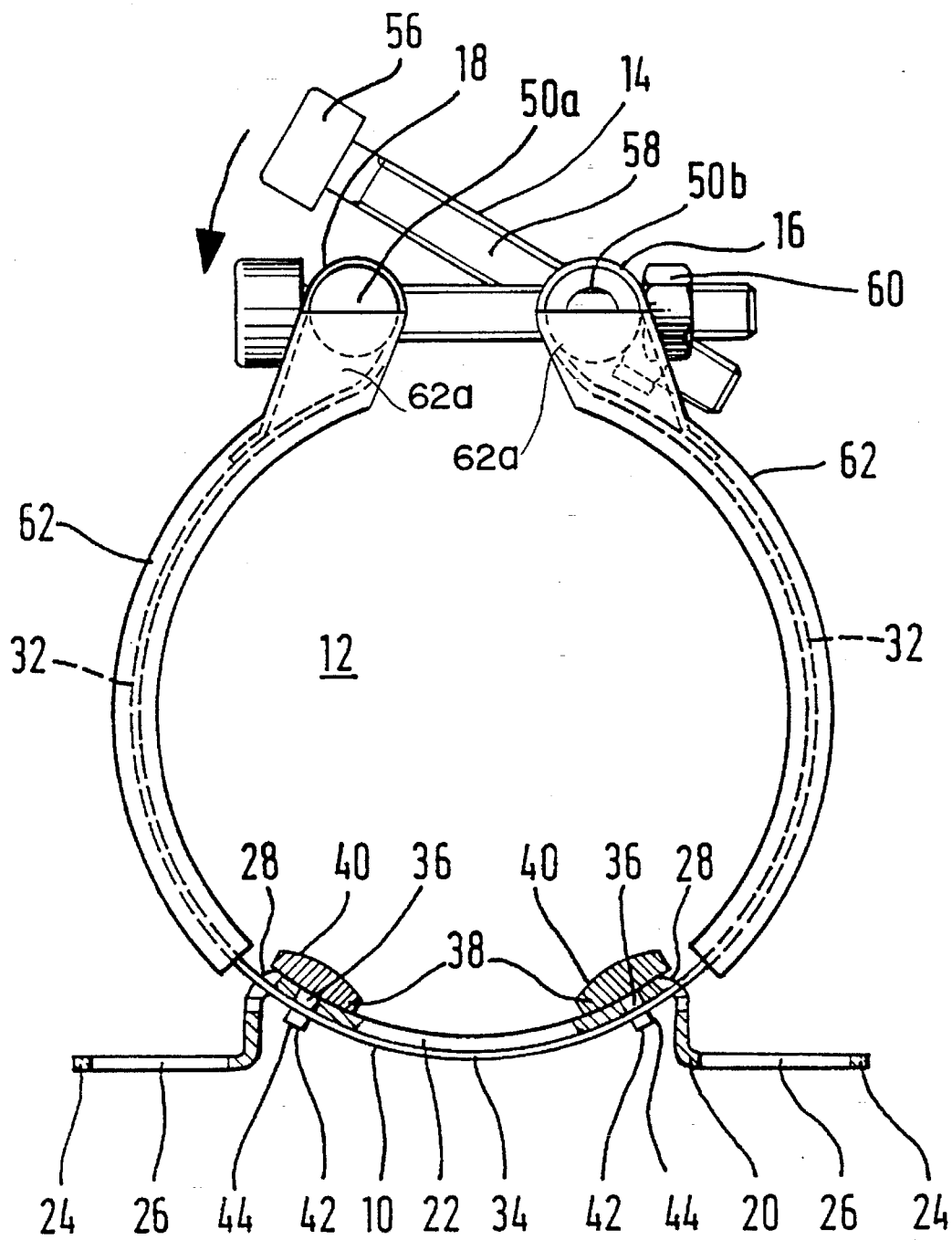
FIG. 1 is a front elevational view, partially in section, of a clamp according to the present invention.

The clamp according to the present invention, shown in FIG. 1, has a continuous flexible collar or attachment element 10, formed from one piece of Nirosta steel. The width of collar 10 can be predetermined and is dependent on the specific article to be received (not shown). In the exemplary embodiment shown in FIG. 1, collar 10 defines the receiving space 12 as a circle for the article to be received. For example, the article can be in the form of a cylindrical pipe or a pressure reservoir. A locking assembly 14 is arranged on top of the clamp. Assembly 14 allows the two ends 16 and 18 of collar 10 to be moved to tightly clamp the article (not shown) received in the clamp. Locking assembly 14 and collar 10 can form a closed loop about an axis.

Figure 3:
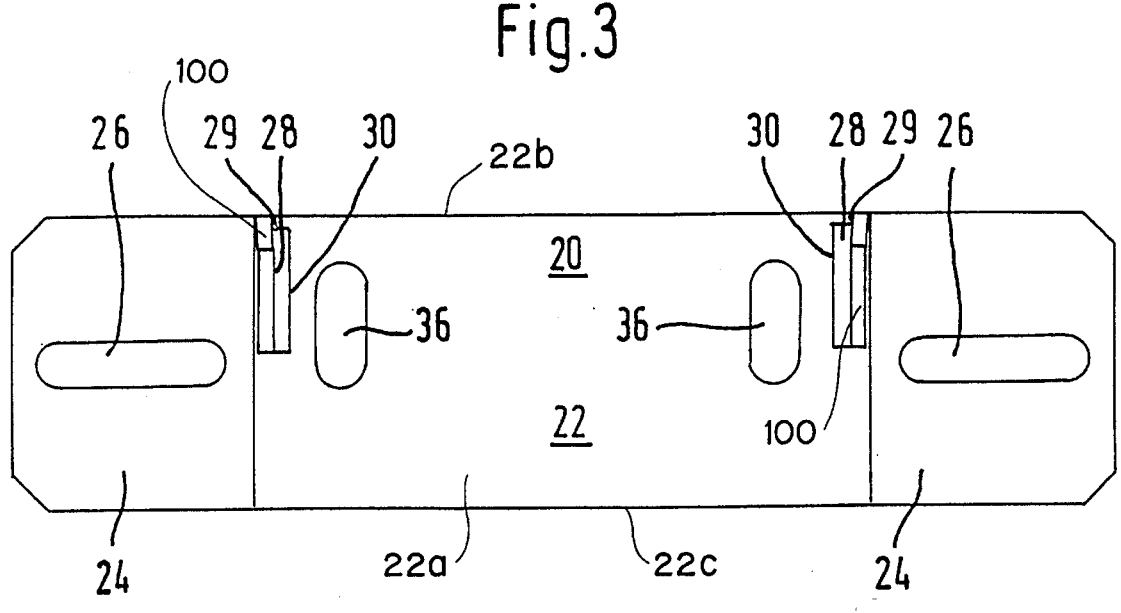
FIG. 3 is a plan view of the holding part of the clamp of FIG. 1.
Figure 4:
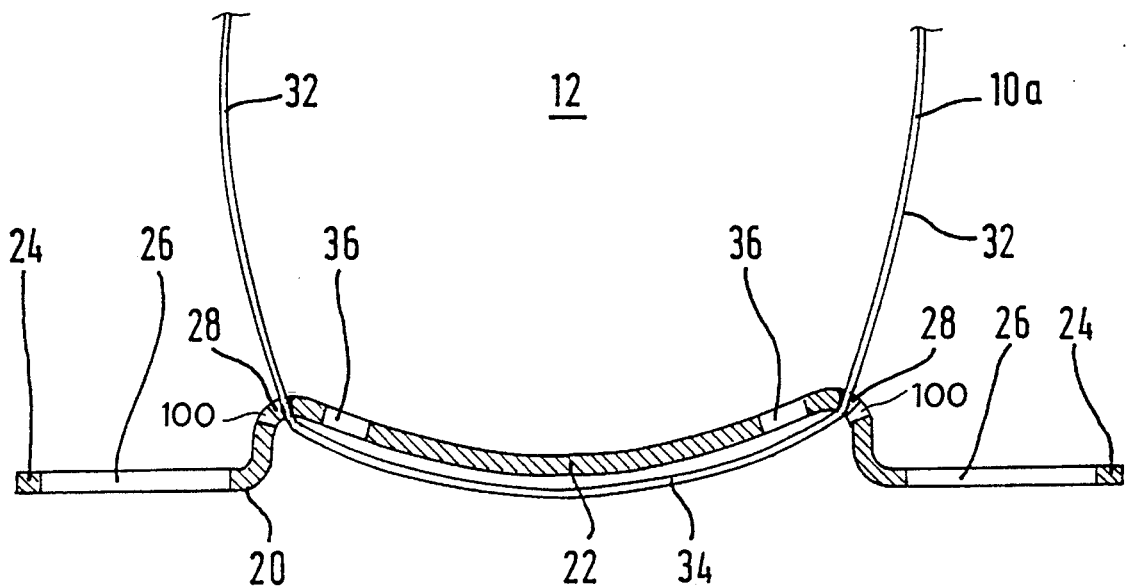

On the bottom of the clamp is a holding part 20 of sheet steel. The holding part is shown in greater detail in FIGS. 3 and 4, with FIG. 4 showing a second embodiment with a collar 10a to be explained more fully hereinafter. Holding part 20 is configured essentially either plate-like or bracket-like and in the middle has a support part 22. Two level square brackets 24 configured as legs are attached at the ends of support part 22. Support part 22 has an upwardly facing holding surface 22a defined between the free side edges 22b and 22c of holding part 20 (FIG. 3). The holding surface 22a receives or holds the part to be gripped or clamped. Side edges 22b and 22c of holding part 20 are substantially parallel and separated along the collar axis.

Each square bracket 24 incorporates an oblong borehole 26 which can be penetrated by a connection means (not shown), such as a screw, for fixing holding part 20 to a housing or a building wall. In each arched area between the two level square brackets 24 and support part 22, a cutout 28 is provided forming the receiving region for collar 10 or 10a. The collar can be inserted into cutouts 28. Each of cutouts 28 penetrates holding part 20 completely and is of a length somewhat shorter than half the width of holding part 20. The width of each cutout 28 is adapted to the material thicknesses of collar 10 or 10a. Both cutouts 28 open to the outside in one lateral side edge 22b of holding part 20 and in turn are accessible through slots 100. Catches 29 and undercuts 30 prevent the release of collar 10 or 10a from the two cutouts 28. Since collar 10 or 10a is elastic, it can be spread out or widened to enter cutouts 28 from the lateral side of holding part 20 through slots 100. Once the collar is fully inserted laterally into slots 100, it will snap into cutouts 28 and behind catches 29 upon being released.

In the embodiment shown in FIG. 1 with collar 10 intended to receive articles of circular or cylindrical cross section, support part 22, arranged between the two cutouts 28, has a curvature identical to the curvature of collar 10 in the same region between these two cutouts 28. Support part 22 is located in the area between the two cutouts 28 and is directly in contact with collar 10 and forms a sort of abutment, as soon as the article to be received is tightly clamped in the clamp.

In collar 10a shown partially in FIG. 4, the collar has a greater radius of curvature than radius of curvature of support part 22 in the area between the two cutouts 28. In this case, collar 10a is bent in both areas of cutouts 28 as seen in FIG. 4 beneath support part 22, so that the two arms 32 of collar 10a have a different curvature than part 34 of collar 10a arranged between these sharply bent points. With this construction of collar 10a, a greater range of widths can be accommodated than with collar 10 of FIG. 1. Collar 10a is also especially suitable for clamping cross sections of elliptically shaped articles. Further, because of the construction of collar 10a, when the collar is not tightly clamped by elastic clamp part 42 of connecting device 38, it is pressed against an undercut 30. Thus, strip 10a is prevented from popping out of a cutout 28. When the article is tightly clamped, then, between the cutouts 28, collar 10a is adapted to the curvature of support part 22 and subsequently takes on this curve.

Figure 5:
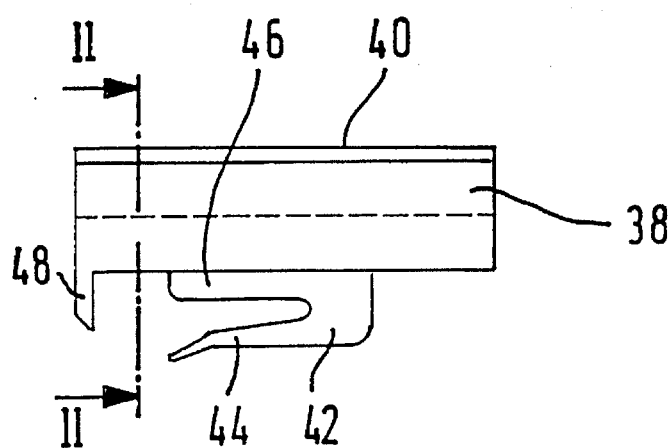
FIG. 5 is a side elevational view of the connection part of the clamp of FIG. 1.
Figure 6:
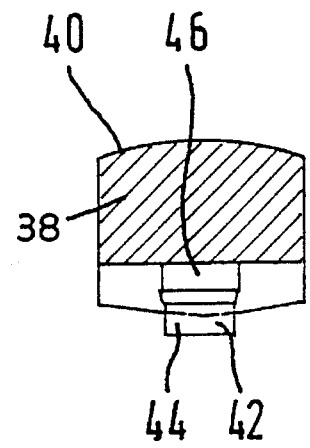
FIG. 6 is an elevational view in cross section taken along line II—II of FIG. 5.

Transverse to the longitudinal line of the two oblong boreholes 26, two more oblong boreholes 36 are provided in convex support part 22. Boreholes 36 are located closely adjacent to the two cutouts 28 extending beyond the longitudinal center of holding part 20, and penetrate this holding part. The two oblong boreholes 36 receive connecting devices 38, one of which is shown in FIGS. 5 and 6. Each connecting device 38 has a contact surface 40, which is crowned, as shown in FIG. 6, and which is provided for engagement with the article (not shown) to be received and clamped. On the side of each connecting device 38, opposite contact surface 40, a clamp member 42 is provided and is elastically flexible. The opening of clamp member 42, including receiving tongue 44, points outward in the same direction as the openings of cutouts 28. The plate element 46 of clamping member 42 connected with receiving tongue 44 fits tightly with oblong borehole 36 and engages in the respective borehole, so that receiving tongue 44 projects out of the bottom of support part 22 (FIG. 1). The relevant contact surface 40 projects into receiving space 12 of the clamp. In order that collar 10 or 10a is mesh-fitted or clamped between plate 46 and receiving tongue 44 and cannot be inadvertently released without some difficulty, a catch 29 is provided on cutouts 28 at one end. Catch 29 holds the collar in contact with clamp part 42 at the side. The catch 48 on connecting device 38 secures the assembly. Polyethylene connecting device 38 can be adapted in its dimensions to whatever collar is being used.

Figure 2:
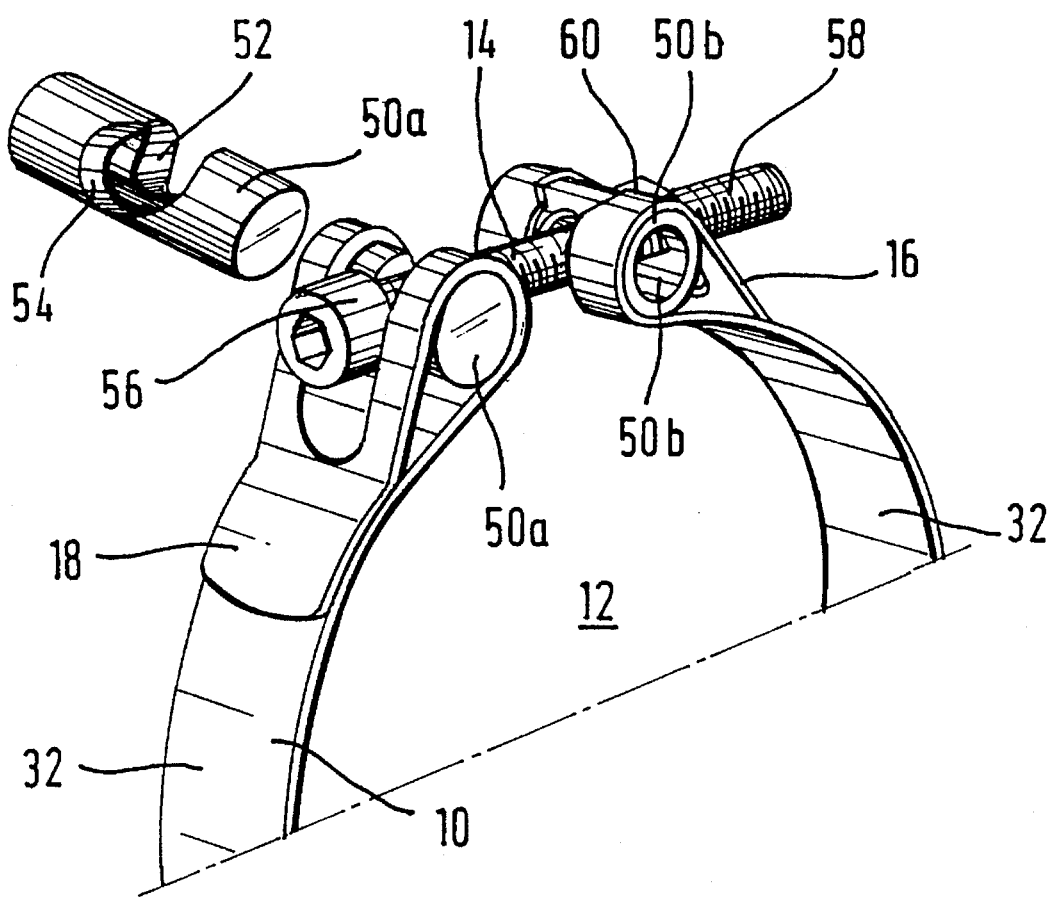
FIG. 2 is a partial perspective view of a part of the collar, without the profiled rubber member and with the locking part of the clamp of FIG. 1.

Locking part 14 incorporates two pegs or lugs 50a and 50b (FIG. 2). The pegs are wrapped and clamped by the ends 16, 18 of collar 10 or 10a. These ends are connected by point welding (not shown) with the top of collar 10 or 10a. The peg 50a to the left in FIG. 1 is shown in more detail in FIG. 2 as it can be viewed more clearly when removed from its position within the clamp. This peg 50a includes a cutout or unthread opening in the form of a laterally open groove 52. Groove 52, as shown particularly in FIG. 2, on the side turned toward the viewer, has a circular recess 54. Recess 54 forms a contact surface for the head 56 of a hex socket head bolt 58, serving as the longitudinally adjustable engagement or meshing part of the clamp. In this manner, recess 54 provides one portion of groove 52, which recess receives and has a diameter corresponding to the diameter of the bolt head, which recess is axially spaced from, opens into and extends rearwardly, or in a direction away from peg 50b, from the remainder of groove 52, and which recess is separated from the remainder of groove 52 by a planar stop surface. Hex socket head bolt 58 penetrates peg 50b, through an unthreaded opening in the form of a laterally closed groove in peg 50b which peg is mounted rotatably within collar 10 or 10a which is wrapped and clamped at this point. Bolt 58 can be pivoted out of its disengagement position in the direction of the arrow in FIG. 1 into its locking position by means of this rotatably mounted peg 50b. Bolt 58 can then engage in cutout 52 in its locking position.

The two ends 16 and 18 are pulled away from each other by the inherent tension or bias of the elastically springing or resilient collar 10 or 10a, so that the bolt head meshes in cutout 54. The two ends 16 and 18 of collar 10 or 10a can then be moved toward and away from each other and the article (not shown) to be received and be tightly clamped in the clamp by means of nut 60 (FIG. 1) mounted on the threaded end of bolt 58 abutting peg or lug 50b. With loosening of nut 60, this connection can be loosened once again, and head 56 can be forcefully removed from cutout 54. Also, peg 50a can be rotatably mounted relative to peg 50b, so that articulation points are provided at both collar ends 16 and 18 which can be moved relative to one another. This simplifies the manipulation capacity of the clamp, especially with opening and closing of the clamp, by means of locking part 14.

Profiled rubber members 62 are U-shaped in cross section, and completely surrounded collar 10 or 10a around receiving space 12. The ends 62a of the two profiled rubber members 62 turned toward each other can at least partially surround the two pegs 50a, 50b from the side and fix these in their position.

With the clamp shown in smaller scale in FIG. 1, nominal diameters of articles to be received range in size between 167 mm to 229 mm.

In the clamp according to the present invention, the holding part incorporates the receiving part, into which the collar can be introduced. The receiving part, however, can also be a part of the collar, into which the holding part can then be inserted reciprocally.

While various embodiments have been chosen to illustrate the invention, it will be understood by those skilled in the art that various changes and modifications can be made therein without departing from the scope of the invention as defined in the appended claims.

What is claimed is:

1. A clamp, comprising:

a flexible collar with a locking part;

a holding part having a holding surface for receiving a part to be clamped and having first and second cutouts receiving said collar, said holding surface being defined between side edges of said holding part, said first and second cutouts opening inwardly from one of said side edges of said holding part and extending at least partly across said holding part; and holding means for locking said collar in place on said holding part.

2. A clamp according to claim 1 wherein said holding means comprises at least one connecting part inserted into said holding part and tightly connecting said collar with said holding part.

3. A clamp according to claim 2 wherein said connecting part comprises contact surface means for engaging a part to be received and gripped by the clamp.

4. A clamp according to claim 3 wherein said holding part comprises a support member which is curved between said first and second cutouts and which has a radius of curvature which is not greater than a radius of curvature of a portion of said collar between said first and second cutouts.

5. A clamp according to claim 4 wherein said holding part has a part with a width greater than a width of said collar; and said support member has a leg connected thereto with mounting means for securing the clamp to a structure.

6. A clamp according to claim 2 wherein said holding part comprises a support member which is curved between said first and second cutouts and which has a radius of curvature which is not greater than a radius of curvature of a portion of said collar between said first and second cutouts.

7. A clamp according to claim 5 wherein
said holding part has a part with a width greater than a width of said collar; and
said support member has a leg connected thereto with mounting means for securing the clamp to a structure.

8. A clamp according to claim 2 wherein
said collar is formed of Nirosta steel;
said holding part is formed of steel sheet; and
said connecting part is formed of polyethylene.

9. A clamp according to claim 1 wherein said collar is formed of one, unitary piece.

10. A clamp according to claim 1 wherein said locking part comprises first and second pegs wrapped and clamped by respective ends of said collar, said first peg being pivotally coupled to said collar and supporting a longitudinally adjustable catch assembly, said second peg having a cutout for receiving said adjustable catch assembly.

11. A clamp according to claim 1 wherein a detachable profiled rubber member is mounted on said collar.

12. A clamp according to claim 1 wherein said holding part has catches extending transversely and partially across said cutouts adjacent said one side edge.

13. A clamp according to claim 1 wherein said locking part comprises first and second lugs at least partially enclosed by first and second ends, respectively, of said collar, said first and second lugs having first and second unthreaded openings, respectively, said first opening being a laterally closed groove of said first lug, said second opening being a laterally open groove of said second lug and having first and second axially spaced portions separated by a planar stop surface;
an adjustable threaded bolt is received in said openings in said lugs, said bolt having one end pivotally coupled to said first end by said first lug and having a head at an opposite end thereof releasably engagable with said stop surface and receivable in said second portion of said second opening; and
a nut is threaded on said bolt at said one end, said nut abutting said first lug.

14. A clamp according to claim 13 wherein said second portion of said second opening comprises a cylindrical recess in said second lug, said recess opening into and extending from said first portion of said second opening and having a diameter corresponding to a diameter of said head.

15. A clamp according to claim 13 wherein
said second lug is firmly attached to said second end of said collar; and
said first lug is pivotally coupled to said first end of said collar.

16. A clamp according to claim 1 wherein
said flexible collar forms a curve defined about an axis; and
said side edges of said holding part are substantially parallel and are separated along said axis.

17. A clamp according to claim 16 wherein said flexible collar forms a closed loop with an adjustable catch assembly attached to ends of said flexible collar.

18. A clamp according to claim 1 wherein
said holding surface and said flexible collar comprise means for holding an object along an axis;
said side edges of said holding part are substantially parallel and are spaced apart along said axis.

19. A clamp according to claim 18 wherein said flexible collar is continuous between ends thereof.

20. A locking device, comprising:
an attachment element having first and second ends to be joined;
first and second lugs at least partially enclosed by said first and second ends, respectively, said first and second lugs having first and second unthreaded openings, respectively, said first opening being a laterally closed groove, said second opening being a laterally open groove and having first and second axially spaced portions separated by a planar stop surface;
an adjustable threaded bolt received in said openings in said lugs, said bolt having one end pivotally coupled to said first end by said first lug and having a head at an opposite end thereof releasably engagable with said stop surface and receivable in said second portion of said second opening; and
a nut threaded on said bolt at said one end, said nut abutting said first lug.

21. A locking device according to claim 18 wherein said second portion of said second opening comprises a circular cylindrical recess in said second lug, said recess opening into and extending from said first portion of said second opening and having a diameter corresponding to a diameter of said head.

22. A locking device according to claim 18 wherein
said second lug is firmly attached to said second end of said attachment element; and
said first lug is pivotally coupled to said first end of said attachment element.

23. A locking device according to claim 18 wherein said attachment element comprises a flexible strap.

* * * * *